United States Patent
Yan

(10) Patent No.: US 10,828,937 B2
(45) Date of Patent: Nov. 10, 2020

(54) COPOLYMER END-FUNCTIONALIZED WITH FUNCTIONAL SILANE, COMPOSITIONS THEREOF AND RELATED PROCESSES

(71) Applicant: Bridgestone Corporation, Chuo-ku (JP)

(72) Inventor: Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 181 days.

(21) Appl. No.: 15/740,052

(22) PCT Filed: Jun. 30, 2016

(86) PCT No.: PCT/US2016/040446
§ 371 (c)(1),
(2) Date: Dec. 27, 2017

(87) PCT Pub. No.: WO2017/004395
PCT Pub. Date: Jan. 5, 2017

(65) Prior Publication Data
US 2018/0186186 A1    Jul. 5, 2018

Related U.S. Application Data

(60) Provisional application No. 62/187,298, filed on Jul. 1, 2015.

(51) Int. Cl.
*B60C 1/00* (2006.01)
*C08F 236/10* (2006.01)
*C08F 212/00* (2006.01)
*C08J 9/00* (2006.01)
*C08K 5/5419* (2006.01)
*C08F 212/08* (2006.01)
*C08C 19/44* (2006.01)
*C08C 19/42* (2006.01)
*C08F 236/06* (2006.01)
*C08C 19/20* (2006.01)
*C08C 19/25* (2006.01)
*C08C 19/22* (2006.01)

(52) U.S. Cl.
CPC .......... *B60C 1/0016* (2013.01); *B60C 1/00* (2013.01); *C08C 19/20* (2013.01); *C08C 19/22* (2013.01); *C08C 19/25* (2013.01); *C08C 19/42* (2013.01); *C08C 19/44* (2013.01); *C08F 212/08* (2013.01); *C08F 236/06* (2013.01); *C08F 236/10* (2013.01); *C08J 9/0042* (2013.01); *C08K 5/5419* (2013.01); *C08F 2500/01* (2013.01)

(58) Field of Classification Search
CPC ........ B60C 1/00; C08F 236/10; C08F 212/08; C08J 9/00; C08K 5/5419
USPC ...................................................... 524/261
See application file for complete search history.

(56) References Cited

U.S. PATENT DOCUMENTS

| | | |
|---|---|---|
| 5,693,172 A | 12/1997 | Zeldin et al. |
| 8,431,644 B2 | 4/2013 | Uesaka |
| 2003/0130402 A1* | 7/2003 | Kobayashi ............... C08L 7/00 524/492 |
| 2010/0041797 A1 | 2/2010 | Hogan et al. |
| 2010/0099810 A1 | 4/2010 | Nishioka et al. |
| 2010/0130664 A1 | 5/2010 | Rachita et al. |
| 2010/0298465 A1 | 11/2010 | Hogan et al. |
| 2011/0178233 A1 | 7/2011 | Chaboche et al. |
| 2012/0225233 A1 | 9/2012 | Guy et al. |
| 2012/0296041 A1 | 11/2012 | Luo |
| 2014/0088320 A1 | 3/2014 | Cho et al. |

(Continued)

FOREIGN PATENT DOCUMENTS

| | | |
|---|---|---|
| EP | 2177562 B1 | 5/2014 |
| JP | 2004-292559 A | 10/2004 |

(Continued)

OTHER PUBLICATIONS

International Preliminary Report on Patentability and Written Opinion from PCT/US2016/040446, dated Jan. 2, 2018.

(Continued)

*Primary Examiner* — Deve V Hall

(74) *Attorney, Agent, or Firm* — Meredith E. Hooker; Jenny L. Sheaffer

(57) ABSTRACT

Disclosed herein are copolymers end-functionalized with functionalized silanes of specified structure, rubber compositions comprising the copolymer, and related processes for preparing the end-functionalized copolymer. The present disclosure also relates to tires having at least one component (e.g., a tread) containing the end-functionalized copolymer or a rubber composition thereof. The copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one group having formula (I).

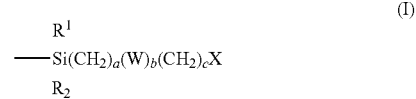

(I)

20 Claims, No Drawings

(56) References Cited

U.S. PATENT DOCUMENTS

| | | | | |
|---|---|---|---|---|
| 2014/0187707 A1* | 7/2014 | Okabe | ............ | C08K 3/36 524/526 |
| 2014/0206793 A1* | 7/2014 | Okabe | ............ | C08K 3/36 523/156 |
| 2014/0243447 A1 | 8/2014 | Cho et al. | | |
| 2014/0357784 A1 | 12/2014 | Morita et al. | | |
| 2015/0148489 A1 | 5/2015 | Luo et al. | | |
| 2016/0177011 A1 | 6/2016 | Kim et al. | | |
| 2016/0208023 A1 | 7/2016 | Lee et al. | | |

FOREIGN PATENT DOCUMENTS

| | | |
|---|---|---|
| JP | 2005-232367 A | 9/2005 |
| JP | 2006249189 A | 9/2006 |
| JP | 2011-093989 A | 5/2011 |
| JP | 2012-172138 A | 9/2012 |
| KR | 10-1310868 B1 | 10/2013 |
| KR | 2015-0044825 A | 4/2015 |
| KR | 2015-0045990 A | 4/2015 |
| WO | WO2013027814 * | 2/2013 |

OTHER PUBLICATIONS

International Search Reported from PCT/US2016/040446, dated Oct. 19, 2016.
European Search Report from application EP 16 81 8803, dated Dec. 3, 2018.
Rosa, Luis G., et al., "Selective nanoshaving of self-assembled monolayers of 2-(4-pyridylethyl)triethoxysilane," Materials Letters, 63(12), pp. 961-964, published May 15, 2009.

* cited by examiner

COPOLYMER END-FUNCTIONALIZED WITH FUNCTIONAL SILANE, COMPOSITIONS THEREOF AND RELATED PROCESSES

FIELD OF THE DISCLOSURE

The present disclosure relates to a copolymer end-functionalized with functionalized silanes of specified structure, rubber compositions comprising the copolymer, and related processes for preparing the end-functionalized copolymer. The present disclosure also relates to tires having at least one component (e.g., a tread) containing the end-functionalized copolymer or a rubber composition thereof.

BACKGROUND

Rubber compositions for vehicles tires may utilize use rubber compositions containing functionalized polymers and copolymers.

SUMMARY

Disclosed herein are a copolymer end-functionalized with functionalized silanes of specified structure, rubber compositions comprising the copolymer, and related processes for preparing the end-functionalized copolymer. The present disclosure also relates to tires having at least one component (e.g., a tread) containing the end-functionalized copolymer or a rubber compositions thereof.

In a first embodiment, an end-functionalized copolymer is disclosed. The end-functionalized copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one group having formula (I)

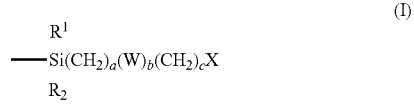

wherein $R^1$ and $R^2$ are the same or different and are independently selected from C1-C20 alkyl and alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii).

In a second embodiment, a rubber composition comprising 5-100 parts by weight of an end-functionalized copolymer according to the first embodiment, 0-95 parts by weight of at least one conjugated diene-monomer containing polymer or copolymer, and 5 to 200 phr of at least one reinforcing filler selected from carbon black, silica, and combinations thereof, is disclosed. More specifically, the end-functionalized copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one group having formula (I)

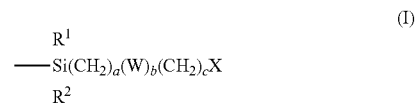

wherein $R^1$ and $R^2$ are the same or different and are independently selected from C1-C20 alkyl and alkoxy; a and c are the same or different and are each an integer from 1 to 10; b is 0 or 1; W is O, S, or NZ where Z is selected from $Si(R^3)_3$ and each $R^3$ is independently selected from C1-C20 alkyl, C2-C20 alkenyl, or C6-C20 aryl; X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii).

In a third embodiment, a tire having a tread comprising the rubber composition of the second embodiment is disclosed. More specifically, the tread comprises a rubber composition comprising 5-100 parts by weight of an end-functionalized copolymer according to the first embodiment, 0-95 parts by weight of at least one conjugated diene-monomer containing polymer or copolymer, and 5 to 200 phr of at least one reinforcing filler selected from carbon black, silica, and combinations thereof, is disclosed. More specifically, the end-functionalized copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one compound of formula (I)

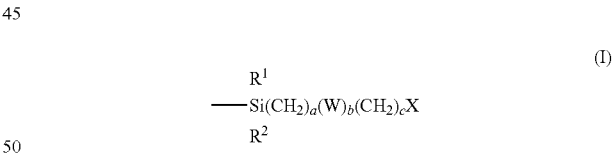

wherein $R^1$ and $R^2$ are the same or different and are independently selected from C1-C20 alkyl and alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii).

In a fourth embodiment, a process for preparing an end-functionalized copolymer is disclosed. The process comprises anionically polymerizing 55-80% by weight of a conjugated diene monomer and 20-45% by weight of an aromatic vinyl monomer lacking any nitrogen substitution on its aromatic ring with an anionic initiator wherein the total amount of conjugated diene monomer and aromatic vinyl monomer comprise 100% (of the total monomers in the copolymer) to produce a copolymer having a living end; reacting the living end of the copolymer with a functionalizing compound of formula (II)

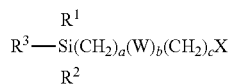
(II)

wherein $R^1$ and $R^2$ are the same or different and are independently selected from C1-C20 alkyl and alkoxy, and $R^3$ is selected from C1-C20 alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof; and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii), thereby producing a copolymer end-functionalized with at least one group having formula (I)

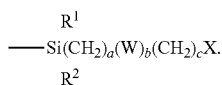
(I)

DETAILED DESCRIPTION

The present disclosure relates to a copolymer end-functionalized with functionalized silanes of specified structure, rubber compositions comprising the copolymer, and related processes for preparing the end-functionalized copolymer. The present disclosure also relates to tires having at least one component (e.g., a tread) containing the end-functionalized copolymer or a rubber compositions thereof.

In a first embodiment, an end-functionalized copolymer is disclosed. The end-functionalized copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one group having formula (I)

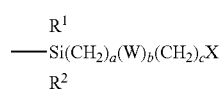
(I)

wherein $R^1$ and $R^2$ are the same or different and are independently selected from C1-C20 alkyl and alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii).

In a second embodiment, a rubber composition comprising 5-100 parts by weight of an end-functionalized copolymer according to the first embodiment, 0-95 parts by weight of at least one conjugated diene-monomer containing polymer or copolymer, and 5 to 200 phr of at least one reinforcing filler selected from carbon black, silica, and combinations thereof, is disclosed. More specifically, the end-functionalized copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one group having formula (I)

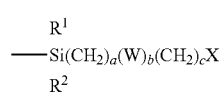
(I)

wherein $R^1$ and $R^2$ are the same or different and are independently selected from C1-C20 alkyl and alkoxy; a and c are the same or different and are each an integer from 1 to 10; b is 0 or 1; W is O, S, or NZ where Z is selected from $Si(R^3)3$ and each $R^3$ is independently selected from C1-C20 alkyl, C2-C20 alkenyl, or C6-C20 aryl; X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii).

In a third embodiment, a tire having a tread comprising the rubber composition of the second embodiment is disclosed. More specifically, the tread comprises a rubber composition comprising 5-100 parts by weight of an end-functionalized copolymer according to the first embodiment, 0-95 parts by weight of at least one conjugated diene-monomer containing polymer or copolymer, and 5 to 200 phr of at least one reinforcing filler selected from carbon black, silica, and combinations thereof, is disclosed. More specifically, the end-functionalized copolymer comprises 55-80% by weight of a conjugated diene monomer and 20-45% by weight of an aromatic vinyl monomer lacking any nitrogen substitution on its aromatic ring, wherein the total amount of conjugated diene monomer and aromatic vinyl monomer comprise 100% (of the total monomers in the copolymer), and the end-functionalization comprises at least one compound of formula (I)

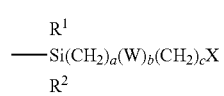
(I)

wherein $R^1$ and $R^2$ are the same or different and are independently selected from C1-C20 alkyl and alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii).

In a fourth embodiment, a process for preparing an end-functionalized copolymer is disclosed. The process comprises anionically polymerizing 55-80% by weight of a conjugated diene monomer and 20-45% by weight of an aromatic vinyl monomer lacking any nitrogen substitution on its aromatic ring with an anionic initiator wherein the total amount of conjugated diene monomer and aromatic vinyl monomer comprise 100% (of the total monomers in the copolymer) to produce a copolymer having a living end; reacting the living end of the copolymer with a functionalizing compound of formula (II)

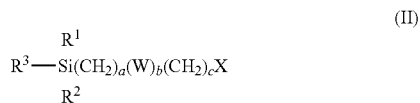

(II)

wherein $R^1$ and $R^2$ are the same or different and are independently selected from C1-C20 alkyl and alkoxy, and $R^3$ is selected from C1-C20 alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof; and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii), thereby producing a copolymer end-functionalized with at least one group having formula (I)

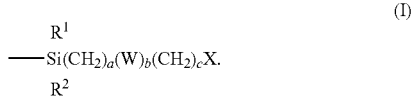

(I)

Definitions

The terminology as set forth herein is for description of the embodiments only and should not be construed as limiting the invention as a whole.

As used herein, the term "head" of a polymer is used to refer to the chain end where initiator residue resides, whereas the term "end" or "tail" is used to refer to the chain end nearest the location where the final monomer unit has been added to the polymer. As used herein, the phrase "at the end" refers to locations at or near the tail (e.g., generally within about 1 to about 40 mer units (including 1 to 40 mer units) from the tail).

As used herein, the abbreviation Mn is used for number average molecular weight.

As used herein, the abbreviation Mp is used for peak molecular weight.

As used herein, the abbreviation Mw is used for weight average molecular weight.

Unless otherwise indicated herein, the term "Mooney viscosity" refers to the compound Mooney viscosity, $ML_{1+4}$. As those of skill in the art will understand, a rubber composition's Mooney viscosity is measured prior to vulcanization or curing.

As used herein, the term "phr" means parts per one hundred parts rubber.

Copolymer and Monomers

As discussed above, according to the first-fourth embodiments disclosed herein, the end-functionalized copolymer comprises 55-80% by weight of a conjugated diene monomer and 20-45% by weight of an aromatic vinyl monomer lacking any nitrogen substitution on its aromatic ring wherein the total amount of conjugated diene monomer and aromatic vinyl monomer comprises 100% of the total monomers in the copolymer. In certain embodiments of the first-fourth embodiments, the copolymer comprises one conjugated diene monomer and one aromatic vinyl monomer lacking any nitrogen substitution on its aromatic ring. In other embodiments of the first-fourth embodiments, the copolymer comprises one or more than one conjugated diene monomer and one or more than one aromatic vinyl monomer lacking any nitrogen substitution on its aromatic ring. In certain embodiments of the first-fourth embodiments disclosed herein, the end-functionalized copolymer comprises 20-45% of an aromatic vinyl monomer lacking any nitrogen substitution on its aromatic ring and 65-80% by weight of a conjugated diene monomer. In certain embodiments of the first-fourth embodiments disclosed herein, the end-functionalized copolymer comprises 20-40% by weight, 20-35% by weight, at least 25% by weight, 25-40% by weight, or 25-35% by weight of an aromatic vinyl monomer lacking any nitrogen substitution on its aromatic ring. By stating that the aromatic vinyl monomer lacks any nitrogen substitution on its aromatic ring is meant that the aromatic ring of the vinyl monomer does not contain any substituent contains nitrogen. Examples of substituent groups that contain nitrogen include 2-pyrrolidinoethyl, N-methylpropylaminoethyl), 2-diphenylaminoethyl). In certain embodiments of the first-fourth embodiments disclosed herein, the end-functionalized copolymer comprises 60-80% by weight, 65-80% by weight, no more than 75% by weight, 60-75% by weight, or 65-75% by weight of a conjugated diene monomer.

While the term "end-functionalized copolymer" is utilized herein, it should be understood that any sample of the end-functionalized copolymer will generally comprise (contain) multiple individual copolymers and, thus, the term end-functionalized copolymers would also be an accurate description. Generally, the end-functionalized copolymer disclosed herein will comprise only one type or structure of the group having formula (I), although more than one group of that particular type or structure may be present at the end of each copolymer. However, in certain embodiments, an end-functionalized copolymer may comprise groups having more than one type or structure according to formula (I); as those of skill in the art will understand such a copolymer can be prepared by utilizing more than one compound according to formula (II).

The structure of the vinyl aromatic monomer lacking any nitrogen substituent on its aromatic ring can vary, but will preferably will be of the general formula $(R^1)(R^2)C=C(R^2)(R^3)$, wherein $R^1$ is an aromatic group containing 6 to 12 carbon atoms, including a phenol group, and a substituted phenol group (wherein the substituent is any one of a halogen group, a C1 to C3 alkyl group, or a hydroxy group), $R^2$ is hydrogen or a lower alkyl of C1-C5 (e.g., methyl) and $R^3$ is hydrogen or a lower alkyl of C1-C5 (e.g., methyl). Non-limiting examples of suitable aromatic vinyl monomers lacking any nitrogen substituent on the aromatic ring include styrene, α-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, vinyl catechol-based, and combinations thereof. In certain embodiments of the first-fourth embodiments, the vinyl aromatic monomer lacking any nitrogen substituent on its aromatic ring comprises or is styrene.

As those of skill in the art understand, a conjugated diene is a compound that has two double carbon-carbon bonds (i.e., two —C═C— bonds) that are separated by a single bond (i.e., —C—); a conjugated diene will contain at least one —C═C—C═C— moiety). The particular structure of the conjugated diene monomer used in the embodiments of the first-fourth embodiments disclosed herein can vary. Non-limiting examples of suitable conjugated diene monomers for use in the embodiments of the first-fourth embodiments disclosed herein include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and combinations thereof. In certain embodiments of the first-fourth embodiments disclosed herein, the conjugated diene monomer comprises or is 1,3-butadiene.

According to the first-fourth embodiments disclosed herein, the molecular weight (Mw) of the end-functionalized copolymer may vary. In certain embodiments of the first-fourth embodiments disclosed herein, the end-functionalized copolymer has a Mw of 100,000 to 800,000 grams/mole. In certain embodiments of the first-fourth embodiments disclosed herein, the end-functionalized copolymer has a Mw of 100,000 to 600,000, including 100,000 to 500,000; 200,000 to 600,000; 200,000 to 500,000; 250,000 to 600,000; and 250,000 to 500,000. The Mw values referred to herein are weight average molecular weights which can be determined by using gel permeation chromatography (GPC) calibrated with polystyrene standards and Mark-Houwink constants for the polymer in question.

According to the first-fourth embodiments disclosed herein, the number average molecular weight (Mn) of the end-functionalized copolymer may vary. In certain embodiments of the first-fourth embodiments disclosed herein, the end-functionalized copolymer has a Mn of 80,000 to 1,00,000, preferably 100,000 to 500,000 grams/mole. The Mn values referred to herein are number average molecular weights which can be determined by using gel permeation chromatography (GPC) calibrated with polystyrene standards and Mark-Houwink constants for the polymer in question.

According to the first-fourth embodiments disclosed herein, the glass transition temperature (Tg) of the end-functionalized copolymer may vary. In certain embodiments of the first-fourth embodiments disclosed herein, the end-functionalized copolymer has a Tg of −20° C. to −70° C. In certain embodiments of the first-fourth embodiments disclosed herein, the end-functionalized copolymer has a Tg of −20° C. to −50° C., including −25° C. to −45° C., and −30° C. to −40° C. The Tg values referred to herein can be determined by DSC (Differential Scanning calorimetry), as described in the working examples herein.

According to the first-fourth embodiments disclosed herein, the vinyl bond content in the butadiene portion of the end-functionalized copolymer may vary. The vinyl bond content in the butadiene portion is a reference to the microstructure of the copolymer and more specifically refers to the mass % of vinyl bonds in the conjugated diene portion of the end-functionalized copolymer which can be determined by $H^1$-NMR and $C^{13}$-NMR (e.g., using a 300 MHz Gemini 300 NMR Spectrometer System (Varian)). In certain embodiments of the first-fourth embodiments disclosed herein, the vinyl bond content in the butadiene (or conjugated diene) portion of the end-functionalized copolymer is greater than 35%, including greater than 35% up to 85%, 40 to 85%, 40 to 80%, 40 to 75%, 40 to 70%, 40 to 65%, 40 to 60%, 45 to 85%, 45 to 80%, 45 to 75%, 45 to 70%, 45 to 65%, 45 to 60%, 50 to 85%, 50 to 80%, 50 to 75%, 50 to 70%, 50 to 65%, and 50-60%. As those of skill in the art will understand, when the vinyl bond content in the butadiene (or conjugated diene) portion of the end-functionalized copolymer is greater than 35%, the cis bond content will necessarily be less than 65% (and the combined cis and trans bond content will also necessarily be less than 65%).

As discussed above, according to the second and third embodiments disclosed herein, the rubber composition comprises 0-95 parts (e.g., 0 parts, 5 parts, 10 parts, 15 parts, 20 parts, 25 parts, 30 parts, 35 parts, 40 parts, 45 parts, 50 parts, 55 parts, 60 parts, 65 parts, 70 parts, 75 parts, 80 parts, 85 parts, 90 parts, or 95 parts) of at least one conjugated diene monomer-containing polymer or copolymer. When the at least one conjugated diene monomer-containing polymer or copolymer is utilized, one or more than may be utilized. Generally, the conjugated diene monomers as discussed above can be utilized to form conjugated diene monomer-containing polymers and can be used in combination with the vinyl aromatic monomers discussed above to form conjugated diene monomer-containing copolymers. In certain embodiments of the second and third embodiments disclosed herein, the rubber composition comprises 5-95 parts of at least one conjugated diene monomer-containing polymer or copolymer which is selected from natural rubber, polyisoprene, styrene-butadiene copolymer, or polybutadiene; in certain such embodiments the polybutadiene is a high cis polybutadiene having a cis bond content of greater than 90%. In certain embodiments of the second and third embodiments, the rubber composition comprises less than 50 parts of the at least one conjugated diene monomer-containing polymer or copolymer. In certain embodiments of the second and third embodiments, the rubber composition comprises 5-95 parts, including 10-95 parts, 15-95 parts, 20-95 parts, 25-95 parts, 5-90 parts, 10-90 parts, 15-90 parts, 20-90 parts, 25-90 parts, 5-85 parts, 10-85 parts, 15-85 parts, 20-85 parts, 25-85 parts, 5-80 parts, 10-80 parts, 15-80 parts, 20-80 parts, 25-80 parts, 5-75 parts, 10-75 parts, 15-75 parts, 20-75 parts, 25-75 parts, 5-70 parts, 10-70 parts, 15-70 parts, 20-70 parts, 25-70 parts, 5-65 parts, 10-65 parts, 15-65 parts, 20-65 parts, 25-65 parts, 5-60 parts, 10-60 parts, 15-60 parts, 20-60 parts, 25-60 parts, 5-55 parts, 10-55 parts, 15-55 parts, 20-55 parts, 25-55 parts, 5-50 parts, 10-50 parts, 15-50 parts, 20-50 parts, 25-50 parts, 5-45 parts, 10-45 parts, 15-45 parts, 20-45 parts, or 25-45 parts of at least one conjugated diene monomer-containing polymer or copolymer.

End-Functionalization

As discussed above, according to the first embodiment disclosed herein, an end-functionalized copolymer is provided which has end-functionalizing comprising at least one group having formula (I). According to the second embodiment disclosed herein, a rubber composition comprising 5-100 parts by weight of the end-functionalized copolymer is provided. According to the third embodiment disclosed herein, a tire having a tread comprising a rubber composition comprising 5-100 parts by weight of the end-functionalized copolymer is provided. According to the fourth embodiment disclosed herein, a process for preparing the end-functionalized copolymer is provided; the process includes reacting the live end of a copolymer with a functionalizing compound of formula (II). As those of skill in the art will appreciate, formulas (I) and (II) differ in structure from each other in that formula (I) lacks the $R^3$ group of formula (II) because the formula (II) compound bonds to the copolymer by losing the $R^3$ group. The formula (II) compound may bond to (end-functionalize) the copolymer at the live end of the copolymer chain, resulting in the Si being directly bonded to the end (or tail) of the copolymer chain (i.e., a copolymer structure according to formula (III) where P comprises the copolymer chain

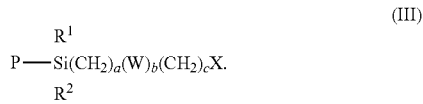

(III)

The formula (II) compound may also bond to (end-functionalize) the copolymer chain via a bridge group. The bridge group may vary depending upon the monomers contained in the copolymer. In certain embodiments of the first-fourth embodiments, the bridge group comprises at least one of 4-methylstyrene or another aromatic-containing spacer (which allows for bonding between the formula (II) compound and the copolymer chain.

As should be apparent from the discussions above, the meaning of $R^1$, $R^2$, W, X, a, b, and c is the same for formula (I), (II) and (III) with the understanding that formula (II) also includes $R^3$. $R^1$ is selected from C1-C20 alkyl and alkoxy. In certain embodiments of the first-fourth embodiments disclosed herein, $R^1$ comprises C1-C20 alkyl; in other embodiments $R^1$ comprises C1-C20 alkoxy. In certain embodiments of the first-fourth embodiments disclosed herein, $R^1$ is selected from C1-C12 alkyl or alkoxy, including C1-C4 alkyl or alkoxy. The foregoing $R^1$ alkyl may be linear or branched. $R^2$ is selected from C1-C20 alkyl and alkoxy. In certain embodiments of the first-fourth embodiments disclosed herein, $R^2$ comprises C1-C20 alkyl; in other embodiments $R^2$ comprises C1-C20 alkoxy. In certain embodiments of the first-fourth embodiments disclosed herein, $R^2$ is selected from C1-C12 alkyl or alkoxy, including C1-C4 alkyl or alkoxy. The foregoing $R^2$ alkyl may be linear or branched. $R^1$ and $R^2$ may be the same or different. $R^3$ is selected from C1-C20 alkoxy. In certain embodiments of the first-fourth embodiments disclosed herein, $R^3$ is selected from C1-C12 alkoxy, including C1-C4 alkoxy. According to formulas (I), (II) and (III), a and c are the same or different and are each an integer from 1 to 10. In certain embodiments of the first-fourth embodiments disclosed herein, a and c are the same or different and are each an integer from 2 to 6. According to formulas (I), (II) and (III), b is 0 or 1. In certain embodiments of the first-fourth embodiments disclosed herein, b is 0. In certain embodiments of the first-fourth embodiments disclosed herein, b is 1. In those embodiments of the first-fourth embodiments disclosed herein where b is 1, W is selected from O, S, or NZ where Z is selected from $Si(R^4)_3$ and each $R^4$ is independently selected from C1-C20 alkyl, C2-C20 alkenyl, or C6-C20 aryl. In certain embodiments of the first-fourth embodiments disclosed herein, b is 1 and W is S. In certain embodiments of the first-fourth embodiments disclosed herein, b is 1 and W is O. In certain embodiments of the first-fourth embodiments disclosed herein, b is 1 and W is NZ. In certain embodiments of the first-fourth embodiments disclosed herein, X has at least one substituent selected from C1-C10 alkyl groups, C6 to C20 aryl groups, C2 to C10 alkenyl groups, C3-C10 non-terminal alkynyl groups, each of the foregoing optionally containing one or more heteroatoms selected from O, Si, N, S, P (any heteroatom being without active hydrogen). By stating that any heteroatom (i.e., O, Si, N, S or P) that is present in a substituent group for X is without active hydrogen is meant that any of the heteroatoms do not include hydrolysable hydrogen (e.g., —OH, —NH, —SH, or —PH. Various compounds meeting the foregoing description for formula (II) are commercially available from companies such as Gelest, Inc. (Morrisvile, Pa.).

According to formulas (I), (II) and (III), X is selected from 5 membered aromatic rings, 6 membered aromatic rings, or fused combinations thereof and each ring of X (i) contains 1-4 nitrogen, (ii) contains 1 sulfur, 1 nitrogen, 1 oxygen, or a combination thereof, and is optionally (iii) substituted with at least one substituent on the aromatic ring, or a combination of at least one of (i) or (ii) with (iii). In other words, according to formulas (I), (II), and (III), X meets at least one of (i) or (ii) and optionally may also meet (iii). Thus, in the first-fourth embodiments disclosed herein, X may be selected from 5 membered aromatic rings, 6 membered aromatic rings, or fused combinations thereof (the fused combinations will be aromatic and may comprise more than one 5 membered ring, more than one 6 membered ring, one 5 membered ring and one 6 membered ring, etc); each ring of X (i) contains 1-4 nitrogen atoms, (ii) contain 1 sulfur, 1 nitrogen, 1 oxygen, or a combination thereof (e.g., 1 sulfur and 1 nitrogen, 1 sulfur and 2 nitrogens), and is optionally (iii) substituted with at least one substituent on the aromatic ring of X. Non-limiting examples of 5 membered aromatic rings for X include pyrrole, thiopene, furan, imidazole, triazole, tetrazole, thiazole, and oxazole. Non-limiting examples of 6 membered aromatic rings for X include pyridine, pyrimidine, and pyrazine (although notably phenyl may be utilized in those embodiments where a fused ring is present and the phenyl is utilized along with at least one additional ring containing a heteroatom as described above). Non-limiting examples of fused combinations thereof for X include quinolone, indole, benzimidazole, benztriazole, indolizine, benzofuran, phthalazine, peteridine, and phenazine-asophenylene. In certain embodiments of the first-fourth embodiments, X comprises pyridine (bonded to the remainder of formula (I), (II) or (III) at the 4, 3 or 2 position. In certain embodiments of the first-fourth embodiments, X comprises pyridine, b is 1 and W is S.

In certain embodiments of the first-fourth embodiments, the amount of compound (II) used relative to the amount of live end copolymer (i.e., the copolymer produced from the conjugated diene monomer and aromatic vinyl monomer lacking any nitrogen) is at least 0.2 molar equivalents, including 0.2 to 15 molar equivalents, 0.2 to 12 molar equivalents, 0.2 to 10 molar equivalents, 0.2 to 8 molar equivalents, 0.2 to 5 molar equivalents, 0.5 to 15 molar equivalents, 0.5 to 12 molar equivalents, 0.5 to 10 molar equivalents, 0.5 to 8 molar equivalents, 0.5 to 5 molar equivalents, and at least 1 molar equivalent. In certain embodiments of the first-fourth embodiments, the amount of compound (II) used is 0.1 to 2 parts by weight per 100 parts by weight of the live end copolymer (i.e., the copolymer produced from the conjugated diene monomer and aromatic vinyl monomer lacking any nitrogen), including 0.2 to 1 parts by weight compound (II) per 100 parts by weight of the live end copolymer.

The percent of end-functionality of the end-functionalized copolymer according to the first-fourth embodiments may vary. The percent of end-functionality (F) refers to the percentage (mole %) of ends or tails of the copolymer that contain at least one group having formula (I), and can be determined using various analytical methods such as NMR or elemental analysis (e.g., based on total nitrogen content). The measurement of percent coupling (% coupled) can be determined using various analytical methods such as GPC. In certain embodiments of the first-fourth embodiments, the end-functionalized copolymer has a % coupling of 10 to 90% (e.g., 10%, 15%, 20%, 25%, 30%, 35%, 40%, 45%, 50%, 55%, 60%, 65%, 70%, 75%, 80%, 85%, 90%), including 10 to 80%, 10 to 70%, 10 to 60%, 10 to 50%, 20 to 90%, 20 to 80%, 20 to 70%, 20 to 60%, and 20 to 50%. The measurement of bound rubber % when the end-functionalized copolymer is incorporated into a rubber composition containing carbon black filler, silica filler, or both can provide an indication of the percent of end-functionality of the end-functionalized copolymer. Bound rubber can be measured by various analytical methods including those described in the working examples herein. In certain embodiments of the first-fourth embodiments disclosed herein, the end-functionalized copolymer (when incorporated into a rubber composition containing all silica filler, i.e., no carbon black filler) will exhibit a bound rubber % of at least 50%, including 50 to 90%, 50 to 80%, or 50 to 70%. In certain embodiments of the first-fourth embodiments disclosed herein, the end-functionalized copolymer (when incorporated into a rubber composition containing all carbon black filler, i.e., no silica filler) will exhibit a bound rubber % of at least 30%, at least 40%, at least 50%, at least 60%, at least 70%, at least 75%, at least 80%, at least 85%, at least 90%, at least 95%, each of the foregoing up to 100%, 99% or 98%. As those of skill in the art will understand analytical methods such as NMR can be used to quantify the amount of end-functionalization.

Rubber Compositions

As discussed above, according to the second and third embodiments disclosed herein, the rubber composition comprises 5 to 200 phr (e.g., 5 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, 200 phr) of at least one reinforcing filler selected from carbon black, silica, and combinations thereof, with the 5 to 200 phr referring to the total amount of reinforcing filler when more than one reinforcing filler is utilized. In other words, such rubber compositions may comprise carbon black filler, silica filler, or a combination of carbon black and silica filler in the foregoing specified amounts. Moreover, it should be understood that one or more than one of each may be utilized as reinforcing filler in the foregoing specified amounts, i.e., one carbon black, more than one carbon black, one carbon black and one silica, one carbon black and more than one silica filler, more than one carbon black and one silica, or more than one carbon black and more than one silica filler. In certain embodiments of the second and third embodiments, the rubber composition comprises 5 to 150 phr, including 10 to 150 phr, 20 to 150 phr, 30 to 150 phr, 5 to 120 phr, including 10 to 120 phr, 20 to 120 phr, 30 to 120 phr, 5 to 100 phr, 10 to 100 phr, 20 to 100 phr, or 30 to 100 phr of at least one reinforcing filler selected from carbon black, silica, and combinations thereof. In certain embodiments of the second and third embodiments, the rubber composition comprises at least one additional reinforcing filler other than carbon black or silica, examples of which are discussed below.

Reinforcing Filler

As used herein, the term "reinforcing" with respect to "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the first-fourth embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first-fourth embodiments disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

Silica

As discussed above, in certain embodiments of the second and third embodiments disclosed herein the at least one reinforcing filler comprises silica. One or more than one reinforcing silica filler may be utilized. Suitable reinforcing silica fillers for use in the rubber composition of certain embodiments of the second and third embodiments disclosed herein are well known. Non-limiting examples of reinforcing silica fillers suitable for use in the rubber compositions of certain embodiments of the second and third embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments of the second and third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the second and third embodiments disclosed herein, the rubber composition comprises a reinforcing silica filler having a surface area (as measured by the BET method) of about 32 m²/g to about 400 m²/g (including 32 m²/g to 400 m²/g), with the range of about 100 m²/g to about 300 m²/g (including 100 m²/g to 300 m²/g) being preferred, and the range of about 150 m²/g to about 220 m²/g (including 150 m²/g to 220 m²/g) being included. In certain embodiments of the second and third embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the second and third embodiments disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165MP), and J. M. Huber Corporation.

In certain embodiments of the second and third embodiments disclosed herein, when the at least one reinforcing filler includes silica filler, one or more than one silica coupling agents may also (optionally) be utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processibility and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the second and third embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises C1 to C20 aliphatic, C5 to C20 cycloaliphatic, or C6 to C20 aromatic; and each $R^2$ independently comprises C1 to C6 aliphatic. In certain exemplary embodiments, each $R^1$ independently comprises C6 to C15 aliphatic and in additional embodiments each $R^1$ independently comprises C8 to C14 aliphatic. Mercapto silanes have the general formula $HS—R^3—Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^6—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is C1 to C6 linear or branched alkylidene and each X is independently selected from the group consisting of C1 to C4 alkyl or C1 to C4 alkoxy.

Non-limiting examples of alkyl alkoxysilanes suitable for use in certain embodiments of the second and third embodiments disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the second and third embodiments disclosed herein include bis(trialkoxysilylorgano) disulfides and bis(trialkoxysilylorgano)tetrasulfides. Specific non-limiting examples of bis(trialkoxysilylorgano)disulfides suitable for use in certain exemplary embodiments of the second and third embodiments disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in certain embodiments of the second and third embodiments disclosed herein include, but are not limited to, bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the second and third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the second and third embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXTTM silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the second and third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., about 5 to about 200 phr, including 5 to 200 phr, about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr about 5 to about 200 phr, including about 25 to about 150 phr, about 35 to about 150 phr, about 25 to about 125 phr, about 25 to about 100 phr, about 25 to about 80 phr, about 35 to about 125 phr, about 35 to about 100 phr, and about 35 to about 80 phr).

When a silica coupling agent is utilized in an embodiment of the second and third embodiments disclosed herein, the amount used may vary. In certain embodiments of the second and third embodiments disclosed herein, the rubber compositions do not contain any silica coupling agent. In other embodiments of the second and third embodiments disclosed herein, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the first-third embodiments disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Carbon Black

As discussed above, in certain embodiments of the second and third embodiments disclosed herein the at least one reinforcing filler which comprises carbon black. One or more than one carbon black reinforcing filler can be utilized. As discussed in more detail below, most carbon blacks are commonly understood to be reinforcing fillers. In certain embodiments of the second and third embodiments disclosed herein, the rubber composition comprises carbon black in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the second and third embodiments disclosed herein, the carbon black comprises no more than about 30% by weight (including no more than 30% by weight) of the total reinforcing filler in the rubber composition. In certain embodiments of the second and third embodiments disclosed herein, the rubber composition comprises about 5 to about 100 phr (including 5 to 100 phr) of one or more carbon blacks.

Generally, suitable carbon black for use as a reinforcing filler in the rubber composition of certain embodiments of the second and third embodiments disclosed herein includes any of the commonly available, commercially-produced carbon blacks, including those having a surface area of at least about 20 m$^2$/g (including at least 20 m$^2$/g) and, more preferably, at least about 35 m$^2$/g up to about 200 m$^2$/g or higher (including 35 m$^2$/g up to 200 m$^2$/g). Surface area values used in this application for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the second and third embodiments disclosed herein, the rubber composition includes a mixture of two or more of the foregoing blacks. Typical suitable carbon blacks for use in certain embodiments of the second and third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Reinforcing Fillers

As discussed above, in certain embodiments of the second and third embodiments disclosed herein, the at least one reinforcing filler comprises a reinforcing filler other than carbon black or silica (i.e., an additional reinforcing filler). One or more than one additional reinforcing filler may be utilized. In certain embodiments of the second and third embodiments disclosed herein, the rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the rubber composition of certain embodiments of the second and third embodiments disclosed herein are well known. Non-limiting examples of suitable additional reinforcing fillers for use in the rubber compositions of certain embodiments of the second and third embodiments disclosed herein include, but are not limited to, alumina, aluminum hydroxide, clay (reinforcing grades), magnesium hydroxide, boron nitride, aluminum nitride, titanium dioxide, reinforcing zinc oxide, and combinations thereof.

Other Ingredients

Other ingredients that may be employed (i.e., are optional) in the rubber compositions of certain embodiments of the second and third embodiments are well known to those of skill in the art and include oils (processing and extender), waxes, processing aids, antioxidants, tackifying resins, reinforcing resins, peptizers, and the components of a cure package.

Various types of tackifying resins are known to those of skill in the art and may be utilized in the rubber compositions of certain embodiments of the second and third embodiments; these include but not limited to: rosin and its derivatives, hydrocarbon resins, and phenol-formaldehyde resins. One or more than one type as well as one or more than one of each type may be utilized in certain embodiments of the second and third embodiments. As used herein the term "resin" is intended to encompass compounds which are solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols. In certain embodiments of the second and third embodiments, the total amount of tackifying resin used is 1 to 25 phr, including 1 to 20 phr, 1 to 15 phr and 1 to 10 phr. In certain embodiments of the second and third embodiments, the total amount of phenolic resin, acrylic resin, and polyphenylene resin is no more than 25 phr, including no more than 20 phr, no more than 15 phr, no more than 10 phr, and no more than 5 phr.

Various antioxidants are known to those of skill in the art and may be utilized in the rubber compositions of certain embodiments of the second and third embodiments; these include but are not limited to certain waxes, phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the second and third embodiments. In certain embodiments of the second and third embodiments, the total amount of antioxidant(s) used is 1 to 5 phr.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAX- OLENE MS from TOTAL FINA ELF, TUDALEN 4160/ 4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, *camellia* oil, jojoba oil, macadamia nut oil, coconut oil, and palm oil. The foregoing processing oils can also be used as an extender oil, i.e., to prepare an oil-extended polymer or copolymer or as a processing or free oil. Generally, for most uses of the rubber compositions in tire components the total amount of oil used (processing oil and extender oil) in the rubber compositions and methods disclosed herein ranges about 1 to about 40 phr, 1 to 40 phr, about 1 to about 20 phr, or 1 to 20 phr.

Preparing the Rubber Compositions

The particular steps involved in preparing rubber composition according to the second and third embodiments disclosed herein are generally those of conventionally practiced methods comprising mixing the ingredients in at least one non-productive master-batch stage and a final productive mixing stage. In certain embodiments of the second and third embodiments, the rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the second and third embodiments disclosed herein, the rubber composition is prepared by a process comprising more than one non-productive master-batch mixing stage.

Generally, the rubbers (or polymers) and at least one reinforcing filler (as well as any silane coupling agent and oil) will be added in a non-productive or master-batch mixing stage or stages. Generally, at least the vulcanizing agent component and the vulcanizing accelerator component of a cure package will be added in a final or productive mixing stage.

In certain embodiments of the second and third embodiments, the rubber composition is prepared using at least one non-productive master batch mixing stage(s) conducted at a temperature of about 130° C. to about 200° C. In certain embodiments of the second and third embodiments, the rubber composition is prepared using a final productive mixing stage conducted at a temperature below the vulcanization temperature in order to avoid unwanted pre-cure of the rubber composition. Therefore, the temperature of the productive or final mixing stage should not exceed about 120° C. and is typically about 40° C. to about 120° C., or about 60° C. to about 110° C. and, especially, about 75° C. to about 100° C. In certain embodiments of the second and third embodiments, the rubber composition is prepared according to a method that includes at least one non-productive mixing stage and at least one productive mixing stage. Where a rubber composition of the second or third embodiment includes fillers other than (or in addition to) carbon black, a separate re-mill stage may be employed for separate addition of a portion or all of the other fillers. This stage often is performed at temperatures similar to, although often slightly lower than, those employed in the masterbatch stage, i.e., ramping from about 90° C. to a drop temperature of about 150° C.

Tires and Tire Treads

As discussed above, the third embodiment disclosed herein is directed to a tire having a tread comprising the rubber composition of the second embodiment. Moreover, the end-functionalized copolymer according to the first embodiment disclosed herein may be particularly useful in rubber compositions that are utilized in the tread component of a tire.

Processes

As discussed above, the fourth embodiment disclosed herein is directed to a process for preparing an end-functionalized copolymer. The process comprises anionically polymerizing no more than 80% by weight of a conjugated diene monomer with at least 20% by weight of an aromatic vinyl monomer lacking any nitrogen substitution on its aromatic ring with an anionic initiator wherein the total amount of conjugated diene monomer and aromatic vinyl monomer comprise 100% (of the total monomers in the copolymer) to produce a copolymer having a living end; reacting the living end of the copolymer with a functionalizing compound of formula (II)

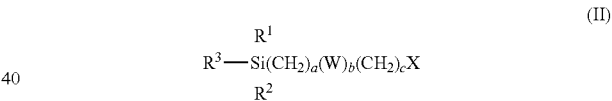

wherein $R^1$ and $R^2$ are the same or different and are independently selected from C1-C20 alkyl and alkoxy, and $R^3$ is selected from C1-C20 alkoxy; a and c are the same or different and are each an integer from 1 to 10; b is 0 or 1; W is O, S, or NZ where Z is selected from $Si(R^4)_3$ and each $R^4$ is independently selected from C1-C20 alkyl, C2-C20 alkenyl, or C6-C20 aryl; X is selected from 5 membered aromatic rings, 6 membered aromatic rings, or fused combinations thereof; and each ring of X (i) contains 1-4 nitrogen, (ii) contains 1 sulfur, 1 nitrogen, 1 oxygen, or a combination thereof, and optionally (iii) is substituted with at least one substituent on the aromatic ring, or a combination of at least one of (i) or (ii) with (iii), thereby producing a copolymer end-functionalized with at least one group having formula (I)

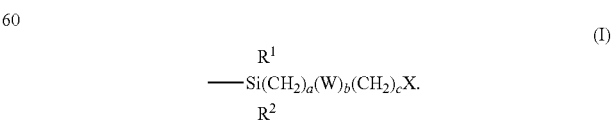

The end-functionalized copolymer produced according to the process of the fourth embodiment disclosed herein, may be utilized in the rubber compositions according to the second and third embodiments disclosed herein, or in other rubber compositions.

Generally, the processes according to the fifth embodiment disclosed herein comprise anionic polymerizations, the general process of which (i.e., other than the use of the functionalizing compound of formula (II)) is well known to those having skill in the art. Generally, the monomers are polymerized according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization, and emulsion polymerization. According to the processes of the fourth embodiment, an anionic polymerization is conducted utilizing an anionic initiator, generally an organic alkaline metal compound, preferably a lithium-containing compound. Examples of lithium-containing compounds useful as anionic initiators include, but are not limited to, hydrocarbyl lithium compounds, lithium amide compounds, and similar lithium compounds. The amount of the lithium compound used as the anionic initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. Generally, the polymerization is conducted using monomers in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

In certain embodiments of the fourth embodiment, the anionic polymerization process is carried out in the presence of a randomizer. The randomizer can control the microstructure of the conjugated diene compound, and has an action that the 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The anionic polymerization process of the fourth embodiment may be carried out through any of solution polymerization, vapor phase polymerization and bulk polymerization. In solution polymerization, the concentration of the monomer in the solution is preferably within a range of 5 to 50% by mass, more preferably 10 to 30% by mass. The polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the functionalizing compounds (i.e., compounds according to formula (II)) other than those utilized in the Examples can be utilized, that the particular end-functionalized copolymer used in the Examples can be utilized in different amounts and/or with rubbers, fillers, and other ingredients which differ in amount, composition, or both from those used in the examples (i.e., as fully disclosed in the preceding paragraphs); and that an end-functionalized copolymer which differs in type, amount or both can be utilized with the rubbers, fillers, and other ingredients used in the examples as well as rubbers, fillers, and other ingredients which different in amount, composition, or both from those used in the examples (i.e., as fully disclosed in the preceding paragraphs).

Examples 1-1 To 1-3

To a two gallon $N_2$ purged reactor equipped with a stirrer was added 1.431 kilograms of hexane, 0.454 kilograms of styrene (33.0 weight weight % in hexane), and 3.055 kilograms of 1,3-butadiene (19.6 weight % in hexane). The reactor was with charged 3.6 milliliters of n-butyl-lithium (1.6 Molar in hexane), followed by 1.25 milliliters of 2,2-bis(2'-tetrahydrofuryl)propane (1.6 Molar in hexane), and the reactor jacket was heated to 50° C. After 33 minutes, the batch temperature peaked at 66.3° C. After an additional 30 minutes, the polymer cement was dropped into dried 28-oz glass bottles (in a quantity of about 400 grams) and reacted with one of three compounds: isopropyl alcohol for Example 1-1, 3-(4-pyridylethyl)thiopro-pyltrimethoxysilane (3.61 Molar, neat) for Example 1-2, and 3-(1,3-dimethylbutylidene)aminopropyltriethoxysilane (3.0 Molar, neat) for Example 1-3, utilizing a 50° C. water bath for 30 minutes. The resulting polymer cements were then dropped into isopropyl alcohol containing butylated hydroxytoluene (BHT), and drum dried. The resulting polymers have properties as shown below in Table 1. Example 1-1 is a control which lacks any end-functionalization.

The Mn, Mw and Mp values listed in Tables 1 and 2 were measured using GPC calibrated with polystyrene standards and Mark-Houwink constants for the polymer in question (i.e., SBR). The % coupling was also measured by GPC. The Tg values listed in Tables 2 and 3 were measured using a differential scanning calorimeter (DSC) instrument, manufactured by TA Instruments (New Castle, Del.), the measurement was conducted using a temperature elevation of 10° C./minute after cooling at −120° C. A tangent was drawn to the base lines before and after the jump of the DSC curve. The temperature on the DSC curve was read at the point corresponding to the middle of the two contact points and used as Tg.

TABLE 1

|     | Mn (grams/mole) | Mw (grams/mole) | Mp (grams/mole) | Mw/Mn | % coupling | Tg (° C.) |
| --- | --- | --- | --- | --- | --- | --- |
| 1-1 | 122349 | 128571 | 125596 | 1.05 | 1.61 | −38.51 |
| 1-2 | 150946 | 193783 | 127369 | 1.28 | 33.56 | −37.95 |
| 1-3 | 148234 | 196622 | 127369 | 1.33 | 30.68 | −38.52 |

Examples 2-1 To 2-2

To a two gallon N$_2$ purged reactor equipped with a stirrer was added 1.462 kilograms of hexane, 0.454 kilograms of styrene (33.0 weight % in hexane), and 3.024 kilograms of 1,3-butadiene (19.8 weight % in hexane). The reactor was charged with 3.60 milliliters of n-butyl-lithium (1.6 Molar in hexane), followed 1.25 milliliters of 2,2-bis(2'-tetrahydrofuryl)propane (1.6 Molar in hexane), and the reactor jacket was heated to 50° C. After 33 minutes, the batch temperature peaked at 65.3° C. After an additional 30 minutes, the polymer cement was dropped into dried 28-oz glass bottles (in a quantity of about 400 grams) and reacted with one of two compounds: 2-(4-pyridylethyl)triethoxysilane (3.7 Molar, neat) for Example 2-1, and 2-(2-pyridylethyl) trimethoxysilane (4.55 Molar, neat) for Example 2-2, utilizing a 50° C. water bath for 30 minutes. The resulting polymer cements were dropped into isopropyl alcohol containing butylated hydroxytoluene (BHT), and drum dried. The resulting polymers have properties as shown below in Table 2.

TABLE 2

|     | Mn (grams/mole) | Mw (grams/mole) | Mp (grams/mole) | Mw/Mn | % coupling | Tg (° C.) |
| --- | --- | --- | --- | --- | --- | --- |
| 2-1 | 142418 | 176518 | 132868 | 1.24 | 24.0 | −37.13 |
| 2-2 | 163685 | 206957 | 117960 | 1.26 | 55.2 | −40.12 |

Examples 3-1 To 3-4 and 4-1 to 4-3

Rubber compositions were prepared using 100 or 80 parts of one of the SBR copolymers prepared according to Examples 1-1, 1-2, 1-4 and 2-1 to 2-2 (notably no rubber composition was prepared using the SBR copolymer of Example 1-3), with the first set of rubber compositions containing silica as reinforcing filler and the second set containing carbon black as reinforcing filler. The formulation for each set of rubber compositions is shown in Table 3, where the amounts of ingredients are listed in phr and the total amount of end-functionalized copolymer+conjugated diene-monomer containing polymer totals 100 parts. The mixing procedure for preparing the composition is shown below in Tables 4A and 4B with Table 4A directed to the silica-containing Examples (3-1 to 3-4) and Table 4B directed to the carbon black-containing Examples (4-1 to 4-3). Examples 3-1 and 4-1 are controls since they contain no end-functionalized copolymer.

TABLE 3

|  | 3-1 | 3-2 | 3-3 | 3-4 | 4-1 | 4-2 | 4-3 |
| --- | --- | --- | --- | --- | --- | --- | --- |
| Master Batch |  |  |  |  |  |  |  |
| SBR | 80 | 80 | 80 | 80 | 100 | 100 | 100 |
| SBR of Example . . . | 1-1 | 2-2 | 2-1 | 1-2 | 1-1 | 2-1 | 1-2 |
| Natural rubber | 20 | 20 | 20 | 20 | 0 | 0 | 0 |
| Silica | 52.5 | 52.5 | 52.5 | 52.5 | 0 | 0 | 0 |
| Carbon black[1] | 0 | 0 | 0 | 0 | 50 | 50 | 50 |
| Wax | 2 | 2 | 2 | 2 | 2 | 2 | 2 |
| Oil | 10 | 10 | 10 | 10 | 10 | 10 | 10 |
| Stearic acid | 2 | 2 | 2 | 2 | 2 | 2 | 2 |
| 6PPD[2] | 0.95 | 0.95 | 0.95 | 0.95 | 0.95 | 0.95 | 0.95 |
| Re-mill |  |  |  |  |  |  |  |
| Silica | 2.5 | 2.5 | 2.5 | 2.5 | Not applicable |  |  |
| Silane | 5 | 5 | 5 | 5 |  |  |  |
| Final |  |  |  |  |  |  |  |
| Sulfur | 1.5 | 1.5 | 1.5 | 1.5 | 1.5 | 1.5 | 1.5 |
| Accelerators | 3.9 | 3.9 | 3.9 | 3.9 | 1.3 | 1.3 | 1.3 |
| Zinc oxide | 2.5 | 2.5 | 2.5 | 2.5 | 2.5 | 2.5 | 2.5 |

[1]N343 grade carbon black
[2]N-phenyl-N'-(1,3-di-methylbutyl)-p-phenylenediamine

TABLE 4A

Mixing Parameters (Silica Compositions)

| Stage | Time | Condition |
| --- | --- | --- |
| Master Batch Stage (initial temp: 120-125° C., rotor rpm started at 50) | 0 seconds 30 seconds | Charge polymers Charge oil, silica filler and other master-batch ingredients, increase rotor speed to 90 rpm Drop based on max temperature of 165° C. or 5.5 minutes mixing (whichever comes first) |
| Remill Stage (initial temp: 130-135° C., rotor rpm at 50) | 0 seconds | Charge Master Batch, add additional silane and additional silica Drop based on max temperature of 150° C. or 3.5 minutes mixing (whichever comes first) |

TABLE 4A-continued

Mixing Parameters (Silica Compositions)

| Stage | Time | Condition |
|---|---|---|
| Final Batch Stage (initial temp: 65-70° C., rotor rpm at 45) | 0 seconds<br>0 seconds | Charge Remill<br>Charge curatives<br>Drop based on max temperature of 100° C. or 2.5 minutes mixing (whichever comes first) |

TABLE 4B

Mixing Parameters (Carbon Black Compositions)

| Stage | Time | Condition |
|---|---|---|
| Master Batch Stage (initial temp: 130-135° C., rotor rpm started at 60) | 0 seconds<br>30 seconds | Charge polymers<br>Charge oil, carbon black filler and other master-batch ingredients, increase rotor speed to 60 rpm<br>Drop based on max temperature of 165° C. or 5.5 minutes mixing (whichever comes first) |
| Final Batch Stage (initial temp: 65-70° C., rotor rpm at 45) | 0 seconds<br>0 seconds | Charge Master Batch<br>Charge curatives<br>Drop based on max temperature of 100° C. or 2.5 minutes mixing (whichever comes first) |

Certain properties of the rubber compositions were measured and are reported below in Table 5. Indexed values were calculated by dividing the value for a rubber composition according to the present disclosure (i.e., Examples 3-2 to 3-4 and 4-2 to 4-3) by its control (i.e., Example 3-1 and 4-1, respectively). The Δ Tg value in Table 5 indicates the difference in Tg for the rubber composition according to the present disclosure as compared to the respective value for the respective control Example (with negative numbers indicating a decrease in Tg as compared to the control value).

Tan δ values were measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature of 60° C. The sample was compressed under a static load of 2 kg before testing. After it reached an equilibrium state, the test started with a dynamic compression load of 1.25 kg at a frequency of 15 Hz. The sample was then dynamically ompressed and then extended and the resultant hysteresis (tan δ) was then recorded. A rubber composition's tan δ at 60° C. is indicative of its rolling resistance when incorporated into a tire tread.

The Mooney viscosities disclosed herein were determined at 100 or 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to either 100 or 130° C. for one minute before the rotor started. The Mooney viscosity was recorded for each sample as the torque at four minutes after the rotor started. Generally, a lower Mooney viscosity is beneficial. Therefore, a lower index value for Mooney viscosity can be considered advantageous.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

The % coupling and Tg were measured as described above (i.e., by GPC and DSC, respectively).

TABLE 5

| Property | 3-1 | 3-2 | 3-3 | 3-4 | 4-1 | 4-2 | 4-3 |
|---|---|---|---|---|---|---|---|
| % coupling[1] | 1.61 | 55.24 | 31.78 | 33.56 | 1.61 | 31.78 | 33.56 |
| Tg (° C.)[1] | −38.51 | −40.12 | −37.13 | −37.95 | −38.51 | −37.13 | −37.95 |

TABLE 5-continued

| Property | 3-1 | 3-2 | 3-3 | 3-4 | 4-1 | 4-2 | 4-3 |
|---|---|---|---|---|---|---|---|
| $ML_{1+4}$ at 100° C.[1] | 17.40 | 46.60 | 28.40 | 37.90 | 17.40 | 28.40 | 37.90 |
| Indexed $ML_{1+4}$ at 130° C.[2] | 1.00 | 2.45 | 2.25 | 2.36 | 1.00 | 2.60 | 2.73 |
| Indexed tan δ at 60° C.[2] | 1.00 | 0.53 | 0.51 | 0.50 | 1.00 | 0.73 | 0.64 |
| Indexed bound rubber (%)[2] | 1.00 | 3.88 | 3.71 | 3.65 | 1.00 | 3.47 | 3.28 |

[1] Refers to measurement on copolymer
[2] Refers to measurement made on rubber composition As can be seen from the data of Table 5, use of the end-functionalized copolymers in rubber compositions leads to lower tan δ at 60° C. indicating that the use of those rubber compositions in tire treads would result in a tire with lower rolling resistance than use of the control rubber composition.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. An end-functionalized copolymer comprising 55-80% by weight of a conjugated diene monomer and 20-45% by weight of an aromatic vinyl monomer lacking any nitrogen substitution on its aromatic ring,
wherein the total amount of conjugated diene monomer and aromatic vinyl monomer comprise 100% of the total monomers in the copolymer, and the aromatic vinyl monomer consists of styrene, and
the end-functionalization comprises at least one group having formula (I)

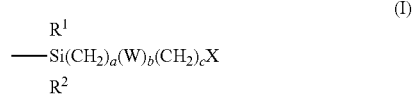

wherein $R^1$ and $R^2$ are the same or different and are independently selected from C1-C20 alkyl and alkoxy,
a and c are the same or different and are each an integer from 1 to 10,
b is 1,
W is O, S, or NZ where Z is selected from $Si(R^4)_3$ and each $R^4$ is independently selected from C1-C20 alkyl, C2-C20 alkenyl, or C6-C20 aryl,
X is selected from 5 membered aromatic rings, 6 membered aromatic rings, or fused combinations thereof and each ring of X contains 1 sulfur, 1 nitrogen, 1 oxygen, or a combination thereof, and optionally is substituted with at least one substituent on the aromatic ring.

2. The end-functionalized copolymer of claim 1, wherein the vinyl bond content in the butadiene portion of the copolymer is greater than 35%.

3. The end-functionalized copolymer of claim 1, wherein at least one of the following is met:
   a. the copolymer has a Mw of 100,000 to 800,000 g/mole (SBR standard); or
   b. the copolymer has a Tg of −20 to −70° C.

4. The end-functionalized copolymer of claim 1, wherein X is substituted with at least one group selected from C1-C10 alkyl groups, C6 to C20 aryl groups, C2 to C10 alkenyl groups, C3-C10 non-terminal alkynyl groups, each optionally containing one or more heteroatoms selected from O, Si, N, S, and P wherein any heteroatom lacks active hydrogen.

5. The end-functionalized copolymer of claim 1, wherein W comprises S.

6. The end-functionalized copolymer of claim 1, wherein X comprises a 5 or 6 membered aromatic ring containing 1 nitrogen, optionally substituted with at least one substituent on the aromatic ring.

7. The end-functionalized copolymer of claim 1, wherein the conjugated diene consists of 1,3-butadiene.

8. A rubber composition comprising
   5-100 parts by weight of the end-functionalized copolymer of claim 1,
   0-95 parts by weight of at least one conjugated diene-monomer containing polymer or copolymer, and
   5 to 200 phr of at least one reinforcing filler selected from carbon black, silica, and combinations thereof.

9. A tire having a tread comprising the rubber composition of claim 8.

10. The end-functionalized copolymer of claim 2, wherein the conjugated diene consists of 1,3-butadiene.

11. The end-functionalized copolymer of claim 3, wherein both (a) and (b) are met.

12. The rubber composition of claim 8, wherein the vinyl bond content in the butadiene portion of the copolymer is greater than 35%.

13. The rubber composition of claim 8, wherein at least one of the following is met:
   a. the copolymer has a Mw of 100,000 to 800,000 g/mole (SBR standard); or
   b. the copolymer has a Tg of −20 to −70° C.

14. The rubber composition of claim 13, wherein both (a) and (b) are met.

15. The rubber composition of claim 8, wherein X is substituted with at least one group selected from C1-C10 alkyl groups, C6 to C20 aryl groups, C2 to C10 alkenyl groups, C3-C10 non-terminal alkynyl groups, each optionally containing one or more heteroatoms selected from O, Si, N, S, and P wherein any heteroatom lacks active hydrogen.

16. The rubber composition of claim 8, wherein W comprises S.

17. The rubber composition of claim 8, wherein X comprises a 5 or 6 membered aromatic ring containing 1 nitrogen, optionally substituted with at least one substituent on the aromatic ring.

18. The rubber composition of claim 8, wherein the conjugated diene consists of 1,3-butadiene.

19. The rubber composition of claim 13, wherein the conjugated diene consists of 1,3-butadiene.

20. The rubber composition of claim 1, wherein the end-functionalized copolymer has a head end bearing a hydrocarbyl residue from an anionic initiator.

* * * * *